(12) United States Patent
Kwak et al.

(10) Patent No.: US 11,276,876 B2
(45) Date of Patent: Mar. 15, 2022

(54) SECONDARY BATTERY

(71) Applicant: Samsung SDI Co., Ltd., Yongin-si (KR)

(72) Inventors: Seung Ho Kwak, Yongin-si (KR); Joo Young Go, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 102 days.

(21) Appl. No.: 16/780,626

(22) Filed: Feb. 3, 2020

(65) Prior Publication Data

US 2020/0313147 A1 Oct. 1, 2020

(30) Foreign Application Priority Data

Mar. 29, 2019 (KR) .................. 10-2019-0037113

(51) Int. Cl.
| | |
|---|---|
| *H01M 10/04* | (2006.01) |
| *H01M 50/54* | (2021.01) |
| *H01M 50/46* | (2021.01) |
| *H01M 10/0583* | (2010.01) |
| *H01M 50/417* | (2021.01) |
| *H01M 50/466* | (2021.01) |

(52) U.S. Cl.
CPC ... *H01M 10/0459* (2013.01); *H01M 10/0583* (2013.01); *H01M 50/417* (2021.01); *H01M 50/46* (2021.01); *H01M 50/466* (2021.01); *H01M 50/54* (2021.01)

(58) Field of Classification Search
None
See application file for complete search history.

(56) References Cited

U.S. PATENT DOCUMENTS

| | | | | |
|---|---|---|---|---|
| 2011/0076533 | A1* | 3/2011 | Choi | ............... H01M 50/183 429/94 |
| 2012/0121965 | A1* | 5/2012 | Makino | ............... H01M 4/70 429/156 |

(Continued)

FOREIGN PATENT DOCUMENTS

| | | |
|---|---|---|
| CN | 108199072 A | 6/2018 |
| EP | 2793292 A2 | 10/2014 |

(Continued)

OTHER PUBLICATIONS

EPO website (www.espacenet.com) machine translation of the detailed description of JP 2013-145678A (Year: 2013).*

(Continued)

*Primary Examiner* — Gregg Cantelmo
(74) *Attorney, Agent, or Firm* — Lewis Roca Rothgerber Christie LLP (57) ABSTRACT

A secondary battery includes: an electrode assembly including first electrode plates and second electrode plates alternately stacked with a separator therebetween, and first electrode tabs overlapping one another at a same position and outwardly protruding, the first electrode tabs being uncoated portions of the first electrode plates, and a fixing tape adhered between the separator positioned at each of opposite long side surfaces and outer surfaces of the first electrode tabs; a first collector portion welded to the first electrode tabs of the electrode assembly; and a case accommodating the electrode assembly and the first collector portion.

10 Claims, 7 Drawing Sheets

(56) References Cited

U.S. PATENT DOCUMENTS

| | | | |
|---|---|---|---|
| 2012/0196167 A1 | 8/2012 | Kim et al. | |
| 2014/0315073 A1 | 10/2014 | Kim | |
| 2015/0180082 A1* | 6/2015 | Jung | H01M 10/0583 |
| | | | 429/246 |
| 2018/0076424 A1* | 3/2018 | Kato | H01M 50/103 |
| 2018/0145376 A1* | 5/2018 | Jo | H01M 10/0585 |
| 2018/0233771 A1 | 8/2018 | Miyazaki et al. | |
| 2019/0044177 A1 | 2/2019 | Lee et al. | |
| 2019/0221820 A1 | 7/2019 | Guo et al. | |

FOREIGN PATENT DOCUMENTS

| | | | |
|---|---|---|---|
| EP | 2793292 A3 | | 11/2014 |
| JP | 4753369 B2 | | 6/2011 |
| JP | 2013145678 A | * | 7/2013 |
| JP | 2014-7103 A | | 1/2014 |
| KR | 10-1103499 B1 | | 1/2012 |
| KR | 10-2018-0006324 A | | 1/2018 |

OTHER PUBLICATIONS

EPO Extended European Search Report dated Sep. 1, 2020, issued in corresponding European Patent Application No. 20158776.3 (5 pages).

* cited by examiner

SECONDARY BATTERY

CROSS-REFERENCE TO RELATED APPLICATION

This application claims priority to and the benefit of Korean Patent Application No. 10-2019-0037113, filed on Mar. 29, 2019 in the Korean Intellectual Property Office, the entire content of which is herein incorporated by reference.

BACKGROUND

1. Field

Aspects of embodiments of the present disclosure relate to a secondary battery.

2. Description of the Related Art

Unlike primary batteries that cannot be charged, secondary batteries can be charged and discharged. Low-capacity secondary batteries packaged in the form of a pack including a single battery cell may be used as the power source for various portable small-sized electronic devices, such as, for example, cellular phones or camcorders, while high-capacity secondary batteries having several tens of battery packs connected to one another are widely used as motor-driving power sources, such as in hybrid vehicles, electric vehicles, or the like.

A secondary battery may be manufactured by accommodating an electrode assembly having a separator positioned between a positive electrode plate and a negative electrode plate and an electrolyte in a case and then installing a cap plate on the case. Here, the electrode assembly may be represented by, for example, a winding type or a stack type. Such an electrode assembly may have uncoated region tabs protruding upwardly or laterally and current collector members connected to the uncoated region tabs.

The above information disclosed in this Background section is provided for enhancement of understanding of the background of the described technology and, therefore, it may contain information that does not form the prior art that is already known in this country to a person of ordinary skill in the art.

SUMMARY

According to an aspect of embodiments of the present disclosure, a secondary battery in which misalignment of electrode plates due to an external force may be prevented or substantially prevented due to a fixing tape fixing a separator positioned at the outermost side of an electrode assembly and electrode tabs is provided.

The above and other aspects and features of the present disclosure will be described in or will be apparent from the following description of some example embodiments of the present disclosure.

According to one or more embodiments of the present disclosure, a secondary battery includes: an electrode assembly including first electrode plates and second electrode plates alternately stacked with a separator therebetween, and first electrode tabs overlapping one another at a same position and outwardly protruding, the first electrode tabs being uncoated portions of the first electrode plates, and a fixing tape adhered between the separator positioned at each of opposite long side surfaces and outer surfaces of the first electrode tabs; a first collector portion welded to the first electrode tabs of the electrode assembly; and a case accommodating the electrode assembly and the first collector portion.

The first electrode tabs may outwardly protrude from one of opposite short side surfaces of the electrode assembly and may be collected to then be welded to the first collector portion.

The fixing tape may include a first region adhered to an outer surface of the separator, and a second region adhered to the outer surfaces of the first electrode tabs.

The second region of the fixing tape may be bent toward the one short side surface of the electrode assembly to cover a portion of the one short side surface.

The electrode assembly may further include a plurality of second electrode tabs being uncoated portions of the second electrode plate and outwardly protruding from the other short side surface of the opposite short side surfaces of the electrode assembly.

The fixing tape may be adhered between an outer surface of the separator and outer surfaces of the second electrode tabs.

The separator may extend perpendicular to a direction in which the first electrode tabs and the second electrode tabs respectively located in the first electrode plate and the second electrode plate protrude, and may be bent in a Z-shaped configuration.

The fixing tape may include a first region adhered to an outer surface of the separator and a second region adhered to outer surfaces of the second electrode tabs.

The fixing tape may include two tapes adhered between a first-side end portion of a long side surface of the electrode assembly and the first electrode tabs and between a second-side end portion of the long side surface of the electrode assembly and the second electrode tabs, and two tapes adhered between a first-side end portion of another long side surface of the electrode assembly and the first electrode tabs and between a second-side end portion of the another long side surface of the electrode assembly and the second electrode tabs.

The fixing tape may include polyimide (PI), polypropylene (PP), or polyethylene terephthalate (PET).

As described above, according to an aspect of embodiments of the present disclosure, in a secondary battery, misalignment of electrode plates due to an external force applied thereto may be prevented or substantially prevented by a fixing tape to be fixedly adhered between a separator positioned at an outermost side of an electrode assembly and electrode tabs.

Further, according to an aspect of embodiments of the present disclosure, a secondary battery including a fixing tape fixedly adhered between a separator positioned at the outermost side of an electrode assembly and first electrode tabs and between the outermost separator and second electrode tabs is provided, thereby preventing or substantially preventing misalignment of electrode plates, which may occur when a plurality electrode tabs each protruding to opposite sides of an electrode assembly are collected.

DETAILED DESCRIPTION

Herein, some example embodiments of the present disclosure will be described in further detail. The subject matter of the present disclosure, however, may be embodied in many different forms and should not be construed as being limited to the example (or exemplary) embodiments set forth herein. Rather, these example embodiments are provided so that this disclosure will be thorough and complete and will convey aspects and features of the present disclosure to those skilled in the art.

In addition, in the accompanying drawings, sizes or thicknesses of various components may be exaggerated for brevity and clarity. Like reference numbers refer to like elements throughout. As used herein, the term "and/or" includes any and all combinations of one or more of the associated listed items. In addition, it is to be understood that when an element A is referred to as being "connected to" an element B, the element A may be directly connected to the element B, or one or more intervening elements C may be present therebetween such that the element A and the element B are indirectly connected to each other.

It is to be further understood that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the example term "below" may encompass both an orientation of above and below.

Unless otherwise defined, all terms (including technical and scientific terms) used herein have the same meaning as commonly understood by one of ordinary skill in the art to which this disclosure belongs. It is to be further understood that terms, such as those defined in commonly used dictionaries, should be interpreted as having a meaning that is consistent with their meaning in the context of the relevant art and are not to be interpreted in an idealized or overly formal sense unless expressly so defined herein.

Figure 1A:
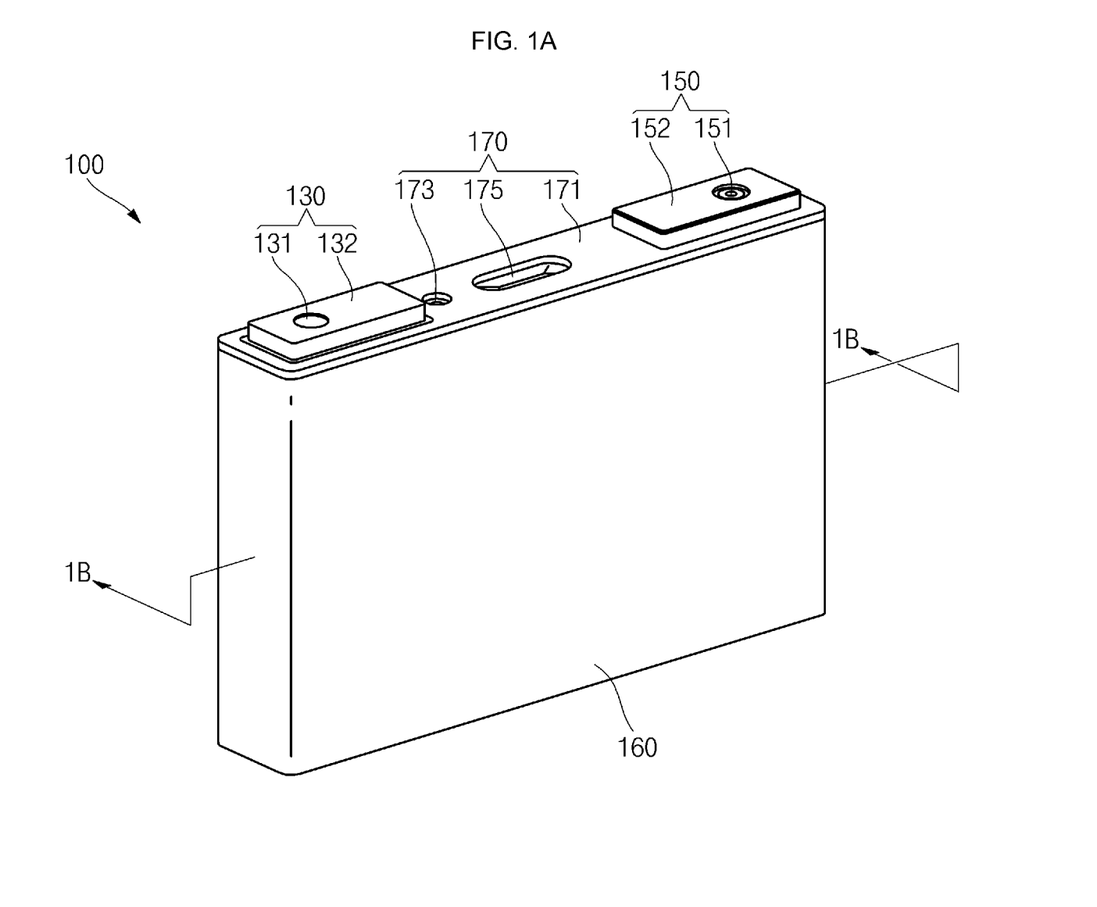
FIGS. 1A and 1B are a perspective view and a cross-sectional view of a secondary battery according to an embodiment of the present disclosure.
Figure 1B:
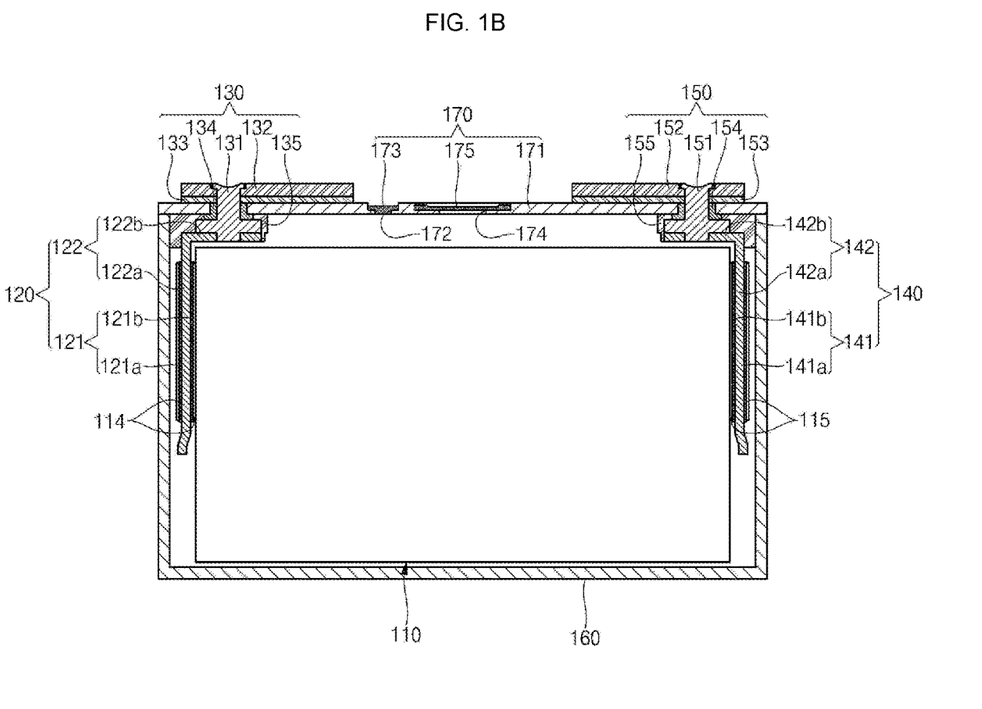
Figure 3A:
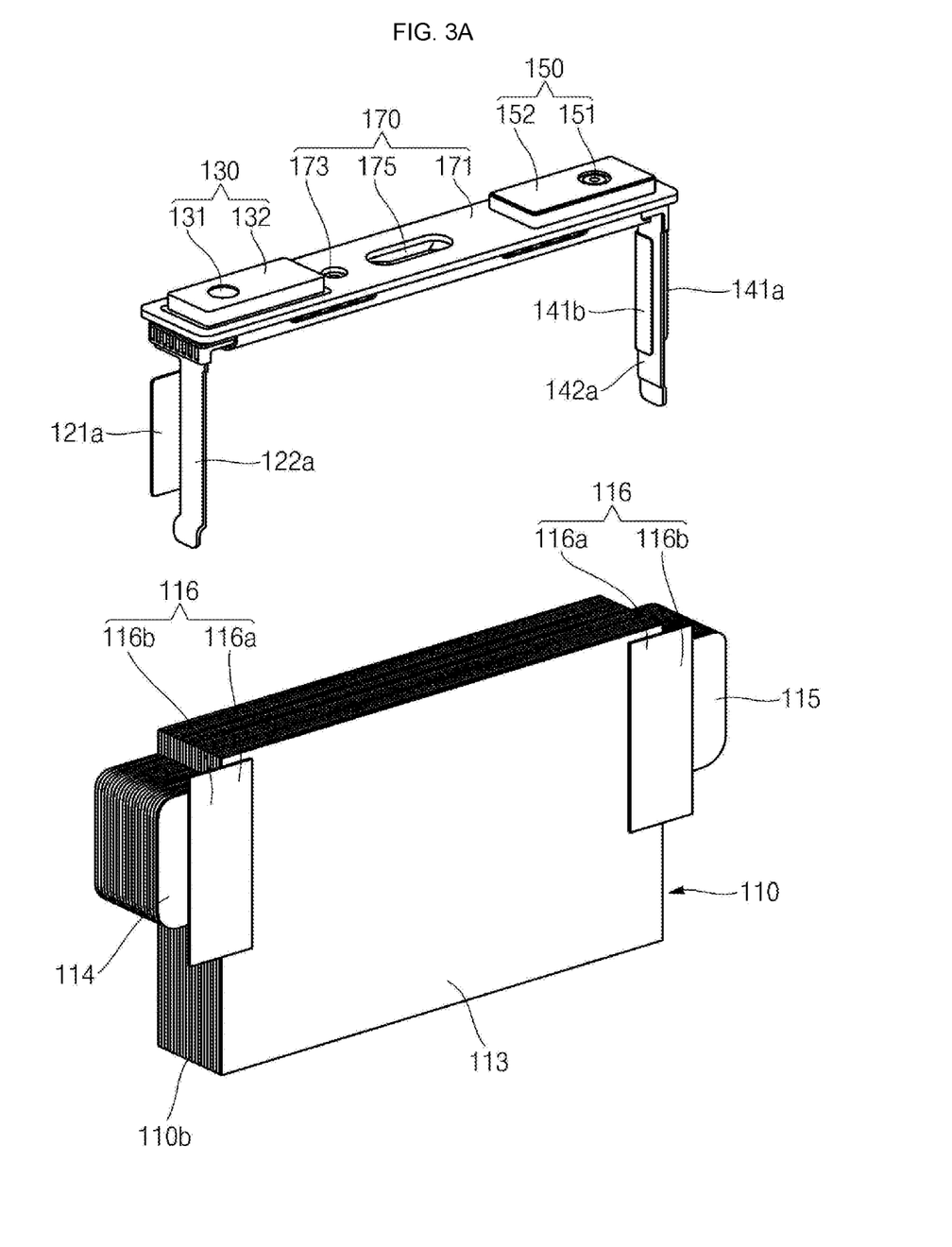
FIGS. 3A and 3B are an exploded perspective view and an assembled perspective view illustrating current collectors and the electrode assembly in the secondary battery shown in FIGS. 1A and 1B.
Figure 3B:
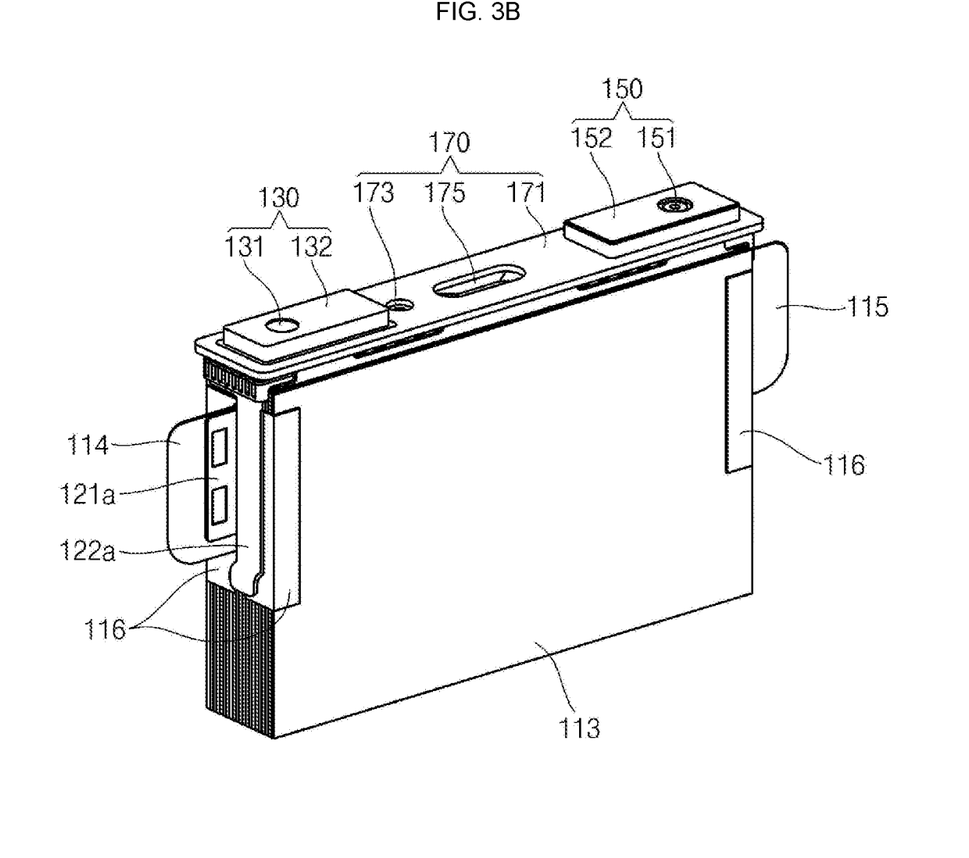

Referring to FIGS. 1A and 1B, a perspective view and a cross-sectional view of a secondary battery according to an embodiment of the present disclosure are illustrated. That is, FIG. 1B is a cross-sectional view taken along the line 1B-1B of FIG. 1A. Referring to FIGS. 3A and 3B, an exploded perspective view and an assembled perspective view illustrating current collectors and an electrode assembly in the secondary battery shown in FIGS. 1A and 1B are illustrated.

As illustrated in FIGS. 1A and 1B, a secondary battery 100 according to an embodiment of the present disclosure includes a stack-type electrode assembly 110, a first collector portion 120 electrically connected to a side of the electrode assembly 110 (e.g., to first electrode tabs 114), a first terminal portion 130 electrically connected to the first collector portion 120, a second collector portion 140 electrically connected to another side of the electrode assembly 110 (e.g., to second electrode tabs 115), a second terminal portion 150 electrically connected to the second collector portion 140, a case 160 accommodating the electrode assembly 110, and a cap assembly 170 coupled to an opening of the case 160.

The secondary battery 100 according to an embodiment of the present disclosure will be described by way of example with regard to a prismatic lithium ion secondary battery, but the present disclosure is not limited thereto and can be applied to any of various types of batteries, including, for example, a lithium polymer battery.

Figure 2A:
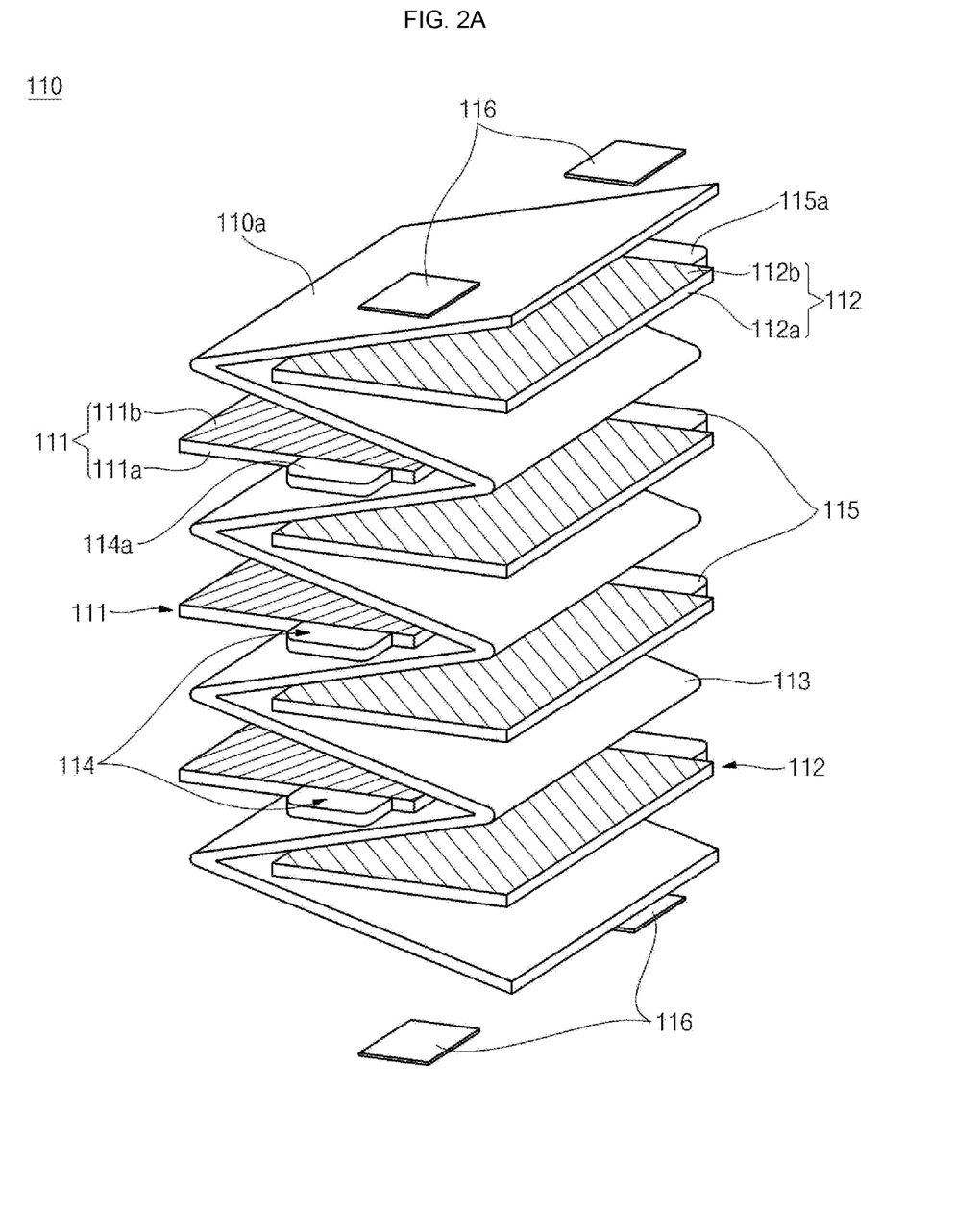
FIGS. 2A, 2B, and 2C are an exploded perspective view, a perspective view, and a partial perspective view of an electrode assembly of the secondary battery shown in FIGS. 1A and 1B.
Figure 2B:
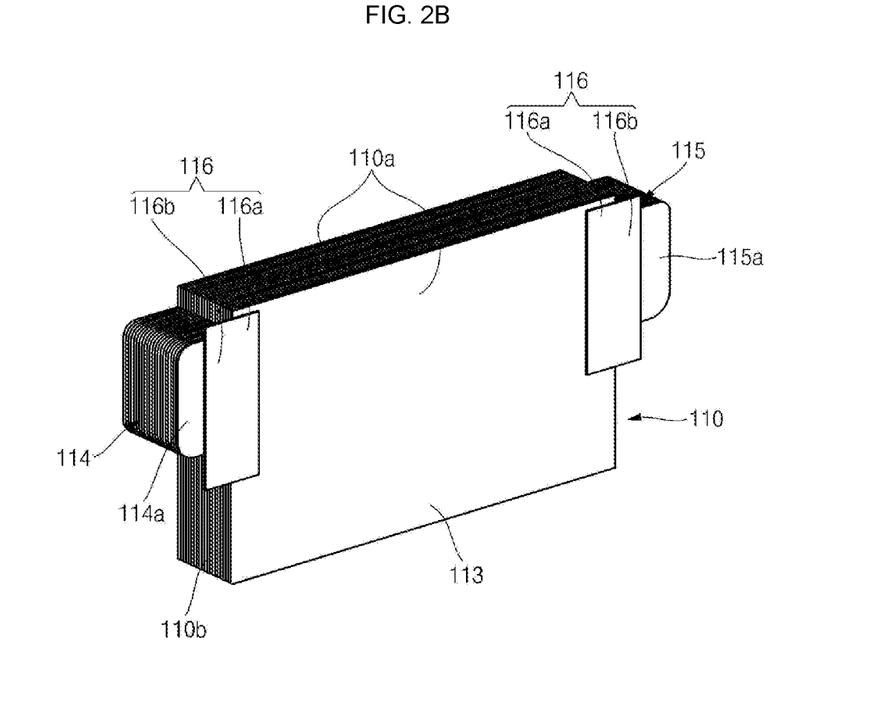
Figure 2C:
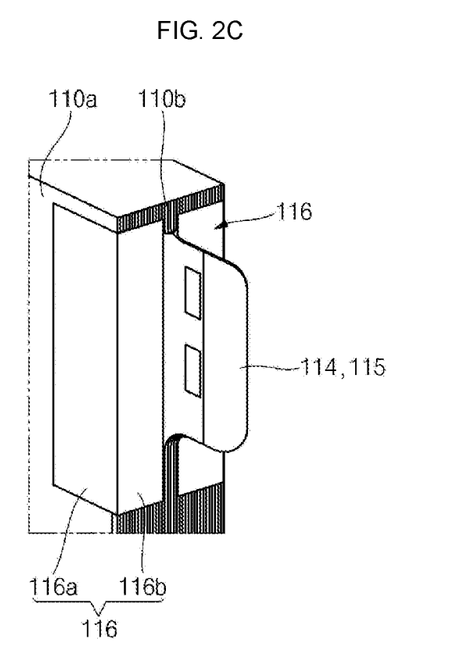

The electrode assembly 110 may include a first electrode plate 111, a second electrode plate 112, a separator 113 positioned between the first and second electrode plates 111 and 112, and a fixing tape 116. Referring to FIGS. 2A to 2C, an exploded perspective view, a perspective view, and a partial perspective view of an electrode assembly of the secondary battery shown in FIGS. 1A and 1B are illustrated. Herein, a configuration of the electrode assembly 110 will be described with reference to FIGS. 2A to 2C.

The electrode assembly 110 includes the first electrode plate 111, the second electrode plate 112, and the separator 113 positioned between the first electrode plate 111 and the second electrode plate 112. In an embodiment, the electrode assembly 110 may include stacks of a plurality of first electrode plates 111 and a plurality of second electrode plates 112. In an embodiment, as shown in FIG. 2A, the separator 113 may have a shape of a plate, which is bent in a Z-shaped configuration so as to be positioned between each of the first electrode plates 111 and each of the second electrode plates 112 to then be stacked. In an embodiment, to prevent or substantially prevent a short circuit between the first electrode plate 111 and the second electrode plate 112, the separator 113 may be larger in size than the first electrode plate 111 and the second electrode plate 112. In addition, the separator 113 may be positioned at one or more outermost sides of the electrode assembly 110, that is, opposite long side surfaces 110a of the stacked electrode assembly 110. In addition, the first electrode tabs 114 and the second electrode tabs 115 may outwardly protrude from opposite short side surfaces 110b of the electrode assembly 110.

In an embodiment, the first electrode plate 111 may operate as a positive electrode, and the second electrode plate 112 may operate as a negative electrode. In another embodiment, the first electrode plate 111 may operate as a negative electrode, and the second electrode plate 112 may operate as a positive electrode. For the sake of convenience, the following description will be provided by way of example with regard to a case in which the first electrode plate 111 operates as a positive electrode and the second electrode plate 112 operates as a negative electrode.

The first electrode plate 111 may include a first electrode current collector 111a made of a metal foil including, for example, aluminum or an aluminum alloy, a first electrode active material 111b, such as a transition metal oxide, coated on the first electrode current collector 111a, and a first electrode tab 114 (e.g., a first uncoated portion) that is a first uncoated region without the first electrode active material 111b coated thereon. The first electrode tab 114 becomes a path for a flow of current between the first electrode plate 111 and the first collector portion 120. In an embodiment, the first electrode tab 114 is pre-formed by being cut to protrude to one side of the first electrode plate 111 when fabricating the first electrode plate 111, to be integrally formed with the first electrode current collector 111a. The plurality of first electrode plates 111 may be stacked such that the first electrode tabs 114 overlap one another at a same position. In an embodiment, the plurality of first electrode tabs 114 may be gathered substantially at the center of one of the short side surfaces 110b of the electrode assembly 110 to then be coupled to one another during welding for being attached to the first collector portion 120. In some examples, the plurality of first electrode tabs 114 may be gathered to be temporarily welded to one another, and the first collector portion 120 may then be welded and coupled to the temporarily welded first electrode tabs 114.

As shown in FIG. 2B, the first electrode tabs 114 may outwardly protrude and extend by a length (e.g., a predetermined length) to a short side surface of the electrode assembly 110. In an embodiment, when the first electrode tabs 114 are welded and coupled to one another, the coupled first electrode tabs 114 may be bent substantially in an L-shaped configuration, as shown in FIG. 2C. With this configuration, the first electrode tabs 114 may be connected to the first collector portion 120, which will be described below. In some examples, the first electrode tabs 114 of the electrode assembly 110 are initially planar, as shown in FIG. 2B. However, after being welded to the first collector portion 120, the first electrode tabs 114 may be bent substantially in the L-shaped configuration.

The second electrode plate 112 may include a second electrode current collector 112a made of a metal foil including, for example, copper or nickel, a second electrode active material 112b, such as a transition metal oxide, coated on the second electrode current collector 112a, and a second electrode tab 115 (e.g., a second uncoated portion) that is a second uncoated region without the second electrode active material 112b coated thereon. The second electrode tab 115 becomes a path for a flow of current between the second electrode plate 112 and the second collector portion 140. In an embodiment, the second electrode tab 115 is pre-formed by being cut to protrude to a side of the second electrode plate 112 when fabricating the second electrode plate 112, to be integrally formed with the second electrode current collector 112a. The plurality of second electrode plates 112 may be stacked such that the second electrode tabs 115 overlap one another at a same position. In an embodiment, the plurality of second electrode plates 112 may be stacked such that the second electrode tabs 115 are positioned opposite to the first electrode tabs 114. In an embodiment, the plurality of second electrode tabs 115 may be gathered substantially at the center of an opposite short side surface 110b of the electrode assembly 110 to then be coupled to one another during welding for being attached to the second collector portion 140. In some examples, the plurality of second electrode tabs 115 may be temporarily welded to one another, and the second collector portion 140 may then be welded and coupled to the temporarily welded second electrode tab 115.

As shown in FIG. 2B, the second electrode tabs 115 may outwardly protrude and extend by a length (e.g., a predetermined length) to the opposite short side surface 110b of the electrode assembly 110. In an embodiment, when the second electrode tabs 115 are welded and coupled to one another, the coupled second electrode tabs 115 may be bent substantially in an L-shaped configuration, as shown in FIG. 2C. With this configuration, the second electrode tabs 115 may be connected to the second collector portion 140, which will be described below. In some examples, the second electrode tabs 115 of the electrode assembly 110 are initially planar, as shown in FIG. 2B. However, after being welded to the second collector portion 140, the second electrode tabs 115 may be bent substantially in the L-shaped configuration.

The separator 113 is positioned between the first electrode plate 111 and the second electrode plate 112 to prevent or substantially prevent an electrical short circuit and allows lithium ions to move. In an embodiment, the separator 113 may be made of polyethylene, polypropylene, or a composite film of polyethylene and polypropylene. In an embodiment, the separator 113 may extend perpendicular to a direction in which the first electrode tabs 114 and the second electrode tabs 115 protrude and may be bent in a Z-shaped configuration to then be positioned between the first electrode plate 111 and the second electrode plate 112.

The fixing tape 116 may be adhered between the separator 113 positioned at the outermost side of the electrode assembly 110 and the first electrode tabs 114 and between the separator 113 positioned at the outermost side of the electrode assembly 110 and the second electrode tabs 115.

The fixing tape 116 may be positioned at opposite end portions of each of the long side surfaces 110a of the electrode assembly 110. For example, the fixing tape 116 may be adhered between a first-side end portion of one long side surface 110a of the electrode assembly 110 and the first electrode tabs 114 and between a second-side end portion of the one long side surface 110a and the second electrode tabs 115. In addition, the fixing tape 116 may be adhered between a first-side end portion of the other long side surface 110a of the electrode assembly 110 and the first electrode tabs 114 and between a second-side end portion of the other long side surface 110a and the second electrode tabs 115. Therefore, in an embodiment, one single electrode assembly 110 may include two of four fixing tapes 116 adhered to each of the opposite long side surfaces 110a.

In an embodiment, each of the four fixing tapes 116 has a first region 116a adhered to the separator 113 and a second region 116b adhered to either of the first electrode tabs 114 or the second electrode tabs 115. In an embodiment, the fixing tape 116 may be a film-type tape having an adhesive layer located on one surface thereof. In an embodiment, the fixing tape 116 may include a highly thermally resistant material to prevent or substantially prevent damage from being caused when the first collector portion 120 and the first electrode tabs 114 are welded to each other or when the second collector portion 140 and the second electrode tabs 115 are welded to each other. For example, the fixing tape 116 may include polyimide (PI), polypropylene (PP), or polyethylene terephthalate (PET).

For the sake of convenience, in the following description, the first electrode tabs 114 and the second electrode tabs 115 may be referred to as electrode tabs 114 and 115, respectively.

In an embodiment, each of the four fixing tapes 116 may be adhered such that the first region 116a is adhered to opposite end portions of the separator 113 positioned on the opposite long side surfaces 110a of the stacked electrode assembly 110, and the second region 116b is adhered to outer surfaces 114a and 115a of the outermost electrode tabs 114 and 115 positioned closest to the outermost separator 113, among the electrode tabs 114 and 115 protruding at the short side surfaces 110b of the electrode assembly 110. Here, the outer surfaces 114a of the first electrode tabs 114 and the outer surfaces 115a of the second electrode tabs 115 refer to outwardly exposed surfaces of the respective electrode tabs without facing other electrode tabs 114 and 115, among the plurality of electrode tabs 114 and 115 of the stacked electrode assembly 110.

The fixing tape 116 may fix the separator 113 positioned at the outermost side of the electrode assembly 110 and the electrode tabs 114 and 115 to one another. When the plurality of first electrode tabs 114 and the plurality of second electrode tabs 115 each protruding from opposite short side surfaces of the electrode assembly 110 are collected, the fixing tape 116 may prevent or substantially prevent the first electrode plate 111 and the second electrode plate 112 from being misaligned. In an embodiment, the plurality of first electrode tabs 114 are collected for being welded to the first collector portion 120 to then be positioned substantially at the center of one of the short side surfaces 110b of the electrode assembly 110. In an embodiment, the plurality of second electrode tabs 115 may be collected for being welded to the second collector portion 140 to then be positioned substantially at the center of the other short side surface 110b of the electrode assembly 110.

When the electrode tabs 114 and 115 are collected, the second regions 116b of the fixing tape 116 may be bent toward the short side surfaces 110b of the electrode assembly 110 to cover portions of the opposite short side surfaces 110b.

The electrode assembly 110 is accommodated in the case 160 with, for example, but not limited to, an electrolyte. In an embodiment, the electrolyte may include an organic solvent, such as Ethylene Carbonate (EC), Propylene Carbonate (PC), Diethyl Carbonate (DEC), Ethyl methyl Carbonate (EMC), or Dimethyl Carbonate (DMC), and a lithium salt, such as $LiPF_6$ or $LiBF_4$. In addition, the electrolyte may be in a liquid, solid, or gel phase.

In an embodiment, the first collector portion 120 includes a first sub collector portion 121 electrically and mechanically connected to the first electrode tabs 114, and a first main collector portion 122 electrically and mechanically connected to the first sub collector portion 121. In an embodiment, after being coupled to the first terminal portion 130 coupled to the cap assembly 170, the first collector portion 120 may be coupled to the first electrode tabs 114 of the electrode assembly 110. Referring to FIG. 3A, an exploded perspective view of the electrode assembly 110 yet to be coupled to the first collector portion 120 is illustrated. Referring to FIG. 3B, an assembled perspective view of the electrode assembly 110 coupled to the first collector portion 120 is illustrated. A configuration of the first collector portion 120 and an assembling operation between the first collector portion 120 and the electrode assembly 110 will now be described with reference to FIGS. 3A and 3B.

In an embodiment, the first sub collector portion 121 includes a first tab connecting portion 121a electrically and mechanically connected to the first electrode tabs 114, and a first collector connecting portion 121b electrically and mechanically connected to the first main collector portion 122. In an embodiment, the first sub collector portion 121 may be shaped as a planar single plate extending in a vertical direction and may have a portion bent to be parallel with the vertical direction. The first tab connecting portion 121a may be positioned between the first electrode tabs 114 and the first main collector portion 122, and the first collector connecting portion 121b may be positioned between the first collector portion 120 and a side surface of the electrode assembly 110. In an embodiment, the first sub collector portion 121 may be a metallic single plate.

In an embodiment, in a state in which the first sub collector portion 121 is bent in an L-shaped configuration, the first collector connecting portion 121b provided at one side may first be welded to the first main collector portion 122, and the first tab connecting portion 121a provided at the other side may then be welded to the first electrode tabs 114. After the first sub collector portion 121 is welded to the first electrode tabs 114 in a state in which one surface of the first sub collector portion 121 is in contact with one surface of the first electrode tabs 114, the first sub collector portion 121 may be bent together with the first electrode tabs 114 so as to be substantially parallel with a surface of the first collector portion 120.

The first tab connecting portion 121a may be welded to the collected plurality of first electrode tabs 114 at once. Here, the first electrode tabs 114 welded to the first tab connecting portion 121a may be electrically connected to each other while being in close contact with each other, thereby reducing the overall thickness of the first electrode tabs 114.

In an embodiment, the first main collector portion 122 includes a first electrode connecting portion 122a electrically and mechanically connected to the first sub collector portion 121, and a first terminal connecting portion 122b bent and extending from a top end of the first electrode connecting portion 122a and electrically and mechanically connected to the first terminal portion 130.

The first electrode connecting portion 122a is brought into contact with and coupled to the first sub collector portion 121 to then be electrically connected to the first electrode tabs 114 of the electrode assembly 110. In an embodiment, the first electrode connecting portion 122a is welded to the first sub collector portion 121 and is configured to extend in a vertical direction. The first electrode connecting portion 122a may be coupled to the first sub collector portion 121 by welding.

In an embodiment, the first terminal connecting portion 122b is shaped as a plate extending horizontally to be parallel with a cap plate 171 of the cap assembly 170 and is coupled to the first terminal portion 130. In an embodiment, the first terminal connecting portion 122b may be welded to the first terminal portion 130 and may be positioned between the cap plate 171 of the cap assembly 170, which will later be described, and the electrode assembly 110. In an embodiment, the first terminal connecting portion 122b may be bent from a top end of the first electrode connecting portion 122a to extend perpendicular thereto.

In an embodiment, the first sub collector portion 121, the first main collector portion 122, and the first electrode tabs 114 may be made of a same material. In an embodiment, the first electrode tabs 114 are made of aluminum, and the first collector portion 120 is also made of an aluminum-based material.

In an embodiment, the first main collector portion 122 is coupled to the first sub collector portion 121 by welding to provide the first collector portion 120. In addition, the first collector portion 120 consisting of the first sub collector portion 121 and the first main collector portion 122 may be welded and coupled to the first terminal portion 130 coupled to the cap assembly 170. The first collector portion 120 having the cap assembly 170 and the first terminal portion 130 coupled thereto may be welded and coupled to the collected plurality of first electrode tabs 114 and the first tab connecting portion 121a of the first sub collector portion 121. In an embodiment, the first tab connecting portion 121a is welded to the first electrode tabs 114 by ultrasonic welding with a pressure (e.g., a predetermined pressure) applied thereto.

However, those skilled in the art will appreciate that the first collector portion 120 is described herein by way of example for a better understanding of the example embodiment of the present disclosure, but may be implemented in any of various shapes and structures.

The first terminal portion 130 is electrically connected to the first electrode tabs 114 of the electrode assembly 110 through the first collector portion 120. In an embodiment, the first terminal portion 130 may include a first terminal pillar 131 passing through the cap plate 171 of the cap assembly 170 and is configured such that the first electrode connecting portion 122a of the first collector portion 120 is electrically connected to the first terminal pillar 131 within the case 160. In addition, the first electrode tabs 114 of the electrode assembly 110 are electrically connected to the first collector portion 120. In an embodiment, the first terminal portion 130 is positioned on the cap plate 171, and may include a first terminal plate 132 (made of, for example, aluminum) coupled to the first terminal pillar 131, a first terminal upper insulation member 133 installed between the first terminal plate 132 and the cap plate 171, a first terminal seal gasket 134 positioned between the first terminal pillar 131 and the cap plate 171, and a first terminal lower insulation member 135 installed between the first collector portion 120 coupled to the first terminal pillar 131 and the cap plate 171.

In an embodiment, the first terminal upper insulation member 133 may be replaced by a high resistance conductor. In such a case, the cap plate 171 and the case 160 may have a same polarity as the first terminal portion 130. For example, the case 160 and the cap plate 171 of the secondary battery 100 may be positively charged.

However, those skilled in the art will appreciate that the first terminal portion 130 is described herein by way of example for a better understanding of the example embodiment of the present disclosure, but may be implemented in any of various shapes and structures.

In an embodiment, the second collector portion 140 includes a second sub collector portion 141 electrically and mechanically connected to the second electrode tabs 115, and a second main collector portion 142 electrically and mechanically connected to the second sub collector portion 141.

In an embodiment, after being coupled to the second terminal portion 150 coupled to the cap assembly 170, the second collector portion 140 may be coupled to the second electrode tabs 115 of the electrode assembly 110. Referring to FIG. 3A, an exploded perspective view of the electrode assembly 110 yet to be coupled to the second collector portion 140 is illustrated. Referring to FIG. 3B, an assembled perspective view of the electrode assembly 110 coupled to the second collector portion 140 is illustrated. A configuration of the second collector portion 140 and an assembling operation between the second collector portion 140 and the electrode assembly 110 will now be described with reference to FIGS. 3A and 3B.

In an embodiment, the second sub collector portion 141 may include a second tab connecting portion 141a electrically and mechanically connected to the second electrode tabs 115, and a second collector connecting portion 141b electrically and mechanically connected to the second main collector portion 142. In an embodiment, the second sub collector portion 141 may be shaped as a planar single plate extending in a vertical direction and may have a portion bent to be parallel with the vertical direction. The second tab connecting portion 141a may be positioned between the second electrode tabs 115 and the second collector portion 140, and the second collector connecting portion 141b may be positioned between the second collector portion 140 and a side surface of the electrode assembly 110. In an embodiment, the second sub collector portion 141 may be a metallic single plate.

In an embodiment, in a state in which the second sub collector portion 141 is bent in an L-shaped configuration, the second collector connecting portion 141b provided at one side may first be welded to the second main collector portion 142, and the second tab connecting portion 141a provided at the other side may then be welded to the second electrode tabs 115. After being welded to the second electrode tabs 115, the second sub collector portion 141 may be bent with the second electrode tabs 115 to be substantially parallel with a surface of the second collector portion 140.

In an embodiment, the second tab connecting portion 141a may be welded to the collected plurality of second electrode tabs 115 at once. Here, the second electrode tabs 115 welded to the second tab connecting portion 141a may be electrically connected to each other while being in close contact with each other, thereby reducing the overall thickness of the second electrode tabs 115.

The second main collector portion 142 includes a second electrode connecting portion 142a electrically and mechanically connected to the second sub collector portion 141, and a second terminal connecting portion 142b bent and extending from a top end of the second electrode connecting portion 142a and electrically and mechanically connected to the second terminal portion 150.

The second electrode connecting portion 142a is brought into contact with and coupled to the second sub collector portion 141 to then be electrically connected to the second electrode tabs 115 of the electrode assembly 110. The second electrode connecting portion 142a is welded to the second sub collector portion 141 and is configured to stand in a vertical direction. The second electrode connecting portion 142a may be coupled to the second sub collector portion 141 by welding.

In an embodiment, the second terminal connecting portion 142b is shaped as a plate horizontally extending to be parallel with the cap plate 171 and is coupled to the second terminal portion 150. In an embodiment, the second terminal connecting portion 142b may be welded to the second terminal portion 150 and may be positioned between the cap plate 171 of the cap assembly 170, which will later be described, and the electrode assembly 110. In an embodiment, the second terminal connecting portion 142b may be bent from a top end of the second electrode connecting portion 142a to extend perpendicular thereto.

In an embodiment, the second sub collector portion 141, the second main collector portion 142, and the second electrode tabs 115 may be made of a same material. In an embodiment, the second electrode tabs 115 are made of a copper-based material, and the second collector portion 140 is also made of a copper-based material.

In an embodiment, the second main collector portion 142 is coupled to the second sub collector portion 141 by welding to provide the second collector portion 140. In an embodiment, the second collector portion 140 consisting of the second sub collector portion 141 and the second main collector portion 142 may be welded and coupled to the second terminal portion 150 coupled to the cap assembly 170. The second collector portion 140 having the cap assembly 170 and the second terminal portion 150 coupled thereto may be welded and coupled to the collected plurality of second electrode tabs 115 and the second tab connecting portion 141a of the second sub collector portion 141.

However, those skilled in the art will appreciate that the second collector portion 140 is described herein by way of example for a better understanding of the example embodiment of the present disclosure, but may be implemented in any of various shapes and structures.

The second terminal portion 150 is electrically to the second electrode tabs 115 of the electrode assembly 110 through the second collector portion 140. In an embodiment, the second terminal portion 150 may include a second terminal pillar 151 passing through the cap plate 171 of the cap assembly 170 and is configured such that the second electrode connecting portion 142a of the second collector portion 140 is electrically connected to the second terminal pillar 151 within the case 160. In addition, the second electrode tabs 115 of the electrode assembly 110 are electrically connected to the second collector portion 140. In an embodiment, the second terminal portion 150 is positioned on the cap plate 171, and may include a second terminal plate 152 (made of, for example, aluminum) coupled to the second terminal pillar 151, a second terminal upper insulation member 153 installed between the second terminal plate 152 and the cap plate 171, a second terminal seal gasket 154 positioned between the second terminal pillar 151 and the cap plate 171, and a second terminal lower insulation member 155 installed between the second collector portion 140 connected to the second terminal pillar 151 and the cap plate 171.

However, those skilled in the art will appreciate that the second terminal portion 150 is described herein by way of example for a better understanding of the example embodiment of the present disclosure, but may be implemented in any of various shapes and structures.

In an embodiment, the case 160 may be shaped as a substantially rectangular parallelepiped having a hollow top opening. The electrode assembly 110 may be inserted into the case 160 through the opening. In addition, the first collector portion 120 and the second collector portion 140 may also be placed in the case 160.

The cap assembly 170 may include a plate-shaped cap plate 171. For example, the cap plate 171 may be made of a thin panel and coupled to the opening of the case 160 to close the opening. In an embodiment, the cap plate 171 includes an electrolyte injection part 172 through which an electrolyte is injected into the case 160. Once the electrolyte is injected, the electrolyte injection part 172 is sealed by a plug 173. In addition, the cap plate 171 may include a vent hole 174, and a vent plate 175 configured to be ruptured when an internal pressure of the sealed case 160 exceeds a certain pressure level (e.g., a preset pressure level) may be installed in the vent hole 174.

While one or more example embodiments have been described to practice the secondary battery of the present disclosure, it will be understood by those of ordinary skill in the art that various changes in form and details may be made therein without departing from the spirit and scope of the present disclosure as set forth in the following claims.

What is claimed is:

1. A secondary battery comprising:
   an electrode assembly comprising first electrode plates and second electrode plates, alternately stacked with a separator therebetween, and first electrode tabs overlapping one another at a same position and outwardly protruding from a short side surface of opposite short side surfaces of the electrode assembly, the first electrode tabs being uncoated portions of the first electrode plates, and a first fixing tape adhered between the separator positioned at a long side surface of opposite long side surfaces of the electrode assembly and an outer surface of an outermost first electrode tab of the first electrode tabs, the first fixing tape having an L-shaped configuration such that a first end of the first fixing tape is located on the separator and a second end of the first fixing tape is located on the short side surface of the electrode assembly;
   a first collector portion welded to the first electrode tabs of the electrode assembly; and
   a case accommodating the electrode assembly and the first collector portion.

2. The secondary battery of claim 1, wherein the first electrode tabs outwardly protrude from the short side surface of the electrode assembly and are collected to be welded to the first collector portion.

3. The secondary battery of claim 2, wherein the first fixing tape comprises a first region adhered to an outer surface of the separator, and a second region adhered to the outer surface of the outermost first electrode tab of the first electrode tabs.

4. The secondary battery of claim 3, wherein the second region of the first fixing tape is bent toward the one short side surface of the electrode assembly to cover a portion of the one short side surface.

5. The secondary battery of claim 2, wherein the electrode assembly further comprises a plurality of second electrode tabs being uncoated portions of the second electrode plate and outwardly protruding from the other short side surface of the opposite short side surfaces of the electrode assembly.

6. The secondary battery of claim 5, wherein a second fixing tape is adhered between an outer surface of the separator and an outer surface of an outermost second electrode tab of the second electrode tabs.

7. The secondary battery of claim 5, wherein the separator extends perpendicular to a direction in which the first electrode tabs and the second electrode tabs respectively located in the first electrode plate and the second electrode plate protrude, and is bent in a Z-shaped configuration.

8. The secondary battery of claim 6, wherein the second fixing tape comprises a first region adhered to an outer surface of the separator and a second region adhered to an outer surface of an outermost second electrode tab of the second electrode tabs.

9. The secondary battery of claim 5, wherein the first fixing tape comprises two tapes adhered between a first-side end portion of the long side surface of the electrode assembly and the outermost first electrode tab of the first electrode tabs and between a second-side end portion of the long side surface of the electrode assembly and an outermost second electrode tab of the second electrode tabs, respectively, and the electrode assembly further comprises another fixing tape comprising two tapes adhered between a first-side end portion of the other long side surface of the opposite long side surfaces of the electrode assembly and another outermost first electrode tab of the first electrode tabs and between a second-side end portion of the another long side surface of the electrode assembly and another outermost second electrode tab of the second electrode tabs, respectively.

10. The secondary battery of claim 1, wherein the first fixing tape comprises polyimide, polypropylene, or polyethylene terephthalate.

* * * * *